United States Patent
Badger et al.

(10) Patent No.: US 7,165,779 B2
(45) Date of Patent: *Jan. 23, 2007

(54) CONVERTIBLE COMBINATION UTILITY/CAMPER TOW TRAILER

(76) Inventors: John T. Badger, 903 S. Fairview Ave., Salt Lake City, UT (US) 84105; Robert J. T. Badger, 2746 Kentucky Ave., Salt Lake City, UT (US) 84117; William A. Badger, 214 E. North Sandrun Rd., Salt Lake City, UT (US) 84103

( * ) Notice: Subject to any disclaimer, the term of this patent is extended or adjusted under 35 U.S.C. 154(b) by 0 days.

This patent is subject to a terminal disclaimer.

(21) Appl. No.: 10/108,133

(22) Filed: Mar. 27, 2002

(65) Prior Publication Data

US 2003/0184055 A1    Oct. 2, 2003

(51) Int. Cl.
B62D 63/06    (2006.01)
(52) U.S. Cl. .................. 280/656; 280/415.1; 296/160; 296/169
(58) Field of Classification Search .............. 280/656, 280/401, 415.1; 296/173, 174, 159, 160, 296/169, 156
See application file for complete search history.

(56) References Cited

U.S. PATENT DOCUMENTS

| | | | | |
|---|---|---|---|---|
| 1,385,437 A * | 7/1921 | Ellerman | .................... | 296/172 |
| 1,477,111 A * | 12/1923 | Eaton | ......................... | 296/169 |
| 1,564,257 A * | 12/1925 | Lippman | .................... | 296/169 |
| 2,133,902 A * | 10/1938 | Patrick | ........................ | 296/13 |
| 2,719,054 A * | 9/1955 | Jennings | ..................... | 296/169 |
| 3,652,122 A | 3/1972 | Beauregard | .................. | 296/23 |
| 3,715,141 A | 2/1973 | Cary | ......................... | 296/23 |
| 3,737,190 A * | 6/1973 | Smith et al. | ................ | 296/159 |
| 3,917,337 A | 11/1975 | Couix | ........................ | 296/23 |
| 4,014,586 A | 3/1977 | Swofford | ..................... | 296/23 |
| 4,057,284 A * | 11/1977 | Blank | ......................... | 296/169 |
| 4,113,301 A * | 9/1978 | Olmstead | .................... | 296/169 |
| 4,863,212 A | 9/1989 | Jansen | ........................ | 296/173 |
| 5,080,426 A | 1/1992 | Johnson | ..................... | 296/161 |
| 5,135,278 A | 8/1992 | Kauffman et al. | ............ | 296/26 |
| 5,462,330 A * | 10/1995 | Brown | ........................ | 296/172 |
| 5,544,671 A | 8/1996 | Phillips | .................... | 135/88.14 |
| 5,558,392 A | 9/1996 | Young | ........................ | 296/157 |
| 5,567,003 A | 10/1996 | Gill | ............................ | 296/173 |
| 5,595,414 A | 1/1997 | Dulnig et al. | ............ | 296/26.02 |

(Continued)

*Primary Examiner*—Jeff Restifo
(74) *Attorney, Agent, or Firm*—Kirton & McConkie; Michael F. Krieger

(57) ABSTRACT

The present invention features a combination utility/camper tow trailer capable of being converted between a first utility functioning configuration or position, a second utility functioning configuration or position, and a sleep functioning configuration or position via first and second configurable panel members. In the first utility functioning position, the combination utility/camper tow trailer is capable of supporting and carrying a load atop the panel members, while simultaneously providing storage in the trailer bed below. In the second utility functioning configuration, the trailer is configured to increase the volume of the interior storage portion of the trailer bed by positioning first and second configurable panel members in an upward extending manner. In the sleep functioning position, the combination utility/camper tow trailer is converted into a tent trailer by positioning first and second configurable panel members in an outward position and removably coupling a tent assembly to the combination utility/camper tow trailer to provide an enclosed sleeping area in which each panel member functions to provide a bed.

16 Claims, 9 Drawing Sheets

U.S. PATENT DOCUMENTS

| | | | |
|---|---|---|---|
| 5,758,679 A | 6/1998 | Tamburelli | 135/88.09 |
| 5,761,854 A | 6/1998 | Johnson et al. | 52/69 |
| 5,884,824 A | 3/1999 | Spring, Jr. | 224/310 |
| 5,915,400 A * | 6/1999 | Pohl et al. | 135/125 |
| 5,988,731 A * | 11/1999 | Eischen | 296/159 |
| 6,007,142 A | 12/1999 | Gehman et al. | 296/171 |
| 6,017,080 A | 1/2000 | Gill | 296/173 |
| 6,017,081 A | 1/2000 | Colby | 296/173 |
| 6,102,468 A | 8/2000 | Lowrey et al. | 296/173 |
| 6,135,526 A | 10/2000 | Reckner, Jr. | 296/37.13 |
| 6,152,511 A * | 11/2000 | Gustafson | 296/32 |
| 6,203,097 B1 | 3/2001 | Podgorney | 296/170 |
| 6,217,106 B1 | 4/2001 | Reckner, Jr. | 296/173 |
| 6,283,537 B1 * | 9/2001 | DeVore, III | 296/182.1 |
| 6,296,297 B1 | 10/2001 | Barrow et al. | 296/173 |
| 6,378,893 B1 * | 4/2002 | Jager | 280/656 |
| 6,446,997 B1 * | 9/2002 | Bergman et al. | 280/414.3 |
| 6,739,617 B1 * | 5/2004 | Martin | 280/656 |
| 2003/0173758 A1 * | 9/2003 | Badger et al. | 280/656 |
| 2005/0093273 A1 * | 5/2005 | McDonell | 280/656 |

* cited by examiner

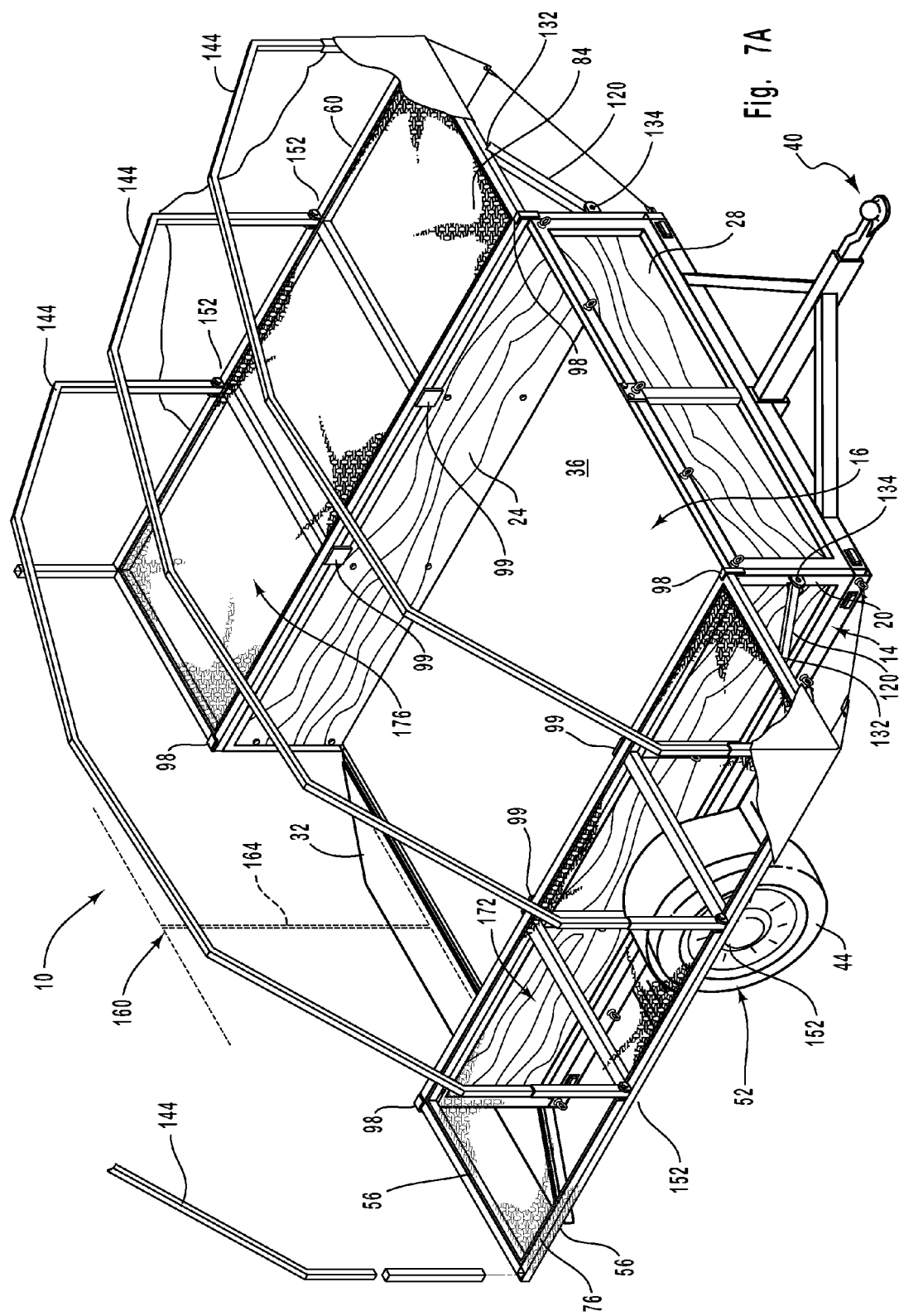

CONVERTIBLE COMBINATION UTILITY/CAMPER TOW TRAILER

BACKGROUND

1. Field of the Invention

The present invention relates to utility and camper tow trailers, and particularly to a combination utility/camper tow trailer comprising a single, integrated concept in which the combination utility/camper tow trailer is capable of converting back and forth between several configurations to function as a utility trailer or a camper tow trailer.

2. Background of the Invention

In recent years, the popularity of camping has increased. Many are flocking to the great outdoors to enjoy its beauty and to escape the drudgery of work and stress filled days. As such, many are purchasing various types of campers, camping trailers, motor homes, etc. to enable them to experience the outdoors in comfort, yet still achieve a desired and reasonable sense of "getting away."

Moreover, due to the large increase in popularity of recreational-type vehicles, many are purchasing ATV's, motorcycles, water craft, etc. to help them enjoy the outdoors even more. In order to do so however, some type of transporting means, such as a utility trailer, is required to haul these recreational vehicles to their intended destination. In a similar manner, those not owning recreational vehicles may have other items that may need to be hauled and transported to a particular site.

In the past, if one desired to take a camping trip with a camper trailer, as well as desiring to bring along one or more recreational vehicles or some other type of cargo load, it was required to have the camper trailer independent of the utility trailer and to pack up and bring along both.

Camper trailers are well known in the art, as are utility trailers. However, camper trailers and utility trailers serve to perform their intended functions with little variance as to being able to provide anything more. A camper trailer may certainly haul various camping gear and paraphernalia, etc., but it is limited in its ability to do so and is not particularly suited for such a purpose. A camper trailer is however, certainly unable to carry heavy and bulky loads, such as an ATV. Likewise, utility trailers are suited mainly for accepting and hauling loads of various size and weight. Utility trailers are ideal for hauling ATV's and other large and heavy items, but are not too particularly suited for sleeping in. As such, it is not uncommon for someone to be seen having multiple trailers to fulfill their needs.

In addition to the inconvenience experienced of towing multiple trailers during a camping expedition, there is an additional downside to prior art tow trailers. It becomes extremely expensive to purchase multiple trailers to fulfill the needs and accommodate the desires of individuals wishing to own a camping trailer as well as a utility trailer.

SUMMARY AND OBJECTS OF THE INVENTION

Based on the foregoing, there is a need for a trailer that may convert back and forth between a utility trailer and a camping trailer with little effort, and without sacrificing any of the benefits in each of these respective stand alone trailer types.

Therefore, it is an object of some embodiments of the present invention to provide a combination utility/camper tow trailer that combines the benefits and advantages of utility-type trailers and camping trailers in a single, fully integrated, easy to use combination utility/camper tow trailer.

It is another object of some embodiments of the present invention to provide a combination utility/camper tow trailer capable of providing multiple functional configurations.

It is still another object of some embodiments of the present invention to provide a combination utility/camper tow trailer capable of converting between a utility trailer and a camping trailer with little effort.

It is a further object of some embodiments of the present invention to provide a combination utility/camper tow trailer that accepts a tent assembly when in a sleep functioning configuration in order to provide an enclosed sleeping area.

In accordance with the invention as embodied and broadly described herein, the present invention features a combination utility/camper tow trailer capable of being towed by a motorized vehicle, and particularly a combination utility/camper tow trailer comprising a floor; a support wall assembly comprising a first side wall support, a second side wall support, and a front wall support, each extending upwards from one or more perimeter portions of the floor, wherein the support wall assembly further defines a perimeter, and wherein the floor and the support wall assembly define an open trailer bed having an interior storage area; a first configurable panel member attached to the first side wall support; a second configurable panel member attached to the second side wall support; repositioning means for at least partly securing the first and second configurable panel members to the first and second side wall supports, respectively, and facilitating the repositioning of the first and second configurable panel members between a first utility functioning position, a second utility functioning position, and a sleep functioning position; a wheel assembly coupled to the combination utility/camper tow trailer; and a hitch assembly coupled to the combination utility/camper tow trailer for removably coupling the combination utility/camper tow trailer to a motorized vehicle.

In a preferred embodiment, repositioning means comprises a hinge coupling the first and second configurable panel members to the first and second side walls. Repositioning means may also be a channel assembly or other configuration or system capable of functioning to allow the configurable panel members to be repositioned such that the combination utility/camper tow trailer is capable of converting between the first and second utility functioning configurations and the sleep functioning configuration.

The first and second side wall supports and the front wall support each extend up from respective perimeter side and front sections of the floor, wherein the second side wall support is offset from said first side wall support in an opposing and complimentary relationship, and wherein the front wall support is connected to the first and second side wall supports in a substantially perpendicular manner.

The support wall assembly further comprises a rear wall support extending up from a perpendicular rear section of the floor and connects to the first and second side wall supports in a substantially perpendicular manner. Like the side wall supports, the rear wall support is offset from the front wall support in an opposing and complimentary relationship.

As stated above, the combination utility/camper tow trailer of the present invention features at least three separate and independent functional positions or configurations. These configurations provide a unique aspect in that they are combined into a single tow trailer, rather than requiring separate trailers to perform each function. Specifically, the combination utility/camper tow trailer of the present invention provides a first utility functioning position that is defined by the first and second configurable panel members being positioned in a substantially horizontal position extending inward from the first and second side wall supports, respectively, as well as being within the planar boundaries of the perimeter. The first and second configurable panel members are positioned in the first utility functioning position such that they are capable of providing a load bearing surface to the combination utility/camper tow trailer, such as for ATV's and other items or materials.

The second utility functioning position is defined by the first and second configurable panel members being positioned in a substantially vertical position such that they extend upward from the first and second side wall supports, respectively. The first and second configurable panel members are positioned in the second utility functioning position such that they are capable of providing an increased interior volume to said trailer bed which is useful when hauling large items or more cargo than is able to fit within the fixed trailer bed.

The sleep functioning position is defined by the first and second configurable panel members being positioned in a substantially horizontal position extending outward from the first and second side wall supports, respectively, and without said perimeter. In this position or configuration, the first configurable panel member defines a first sleeping area and said second configurable panel member defines a second sleeping area. As the configurable panel members extend in a substantially perpendicular manner from the side walls, it is necessary to support these properly so that they are capable of accepting and sustaining a load. Therefore, the present invention provides one or more brace supports designed to fit between the panels and the trailer, thus functioning like a strut to stabilize and support the first and second configurable panel members in the sleep functioning position.

In the sleep functioning position, the combination utility/camper tow trailer is capable of accepting a tent assembly. The tent assembly is removably coupled to said combination utility/camper tow trailer to provide an enclosed sleeping area. Any standard type of tent assembly or configuration is envisioned, with preferences toward a spring bar-type tent assembly.

As such, the trailer of the present invention is capable of being converted from a utility-type trailer to a sleeping or camping trailer with little effort.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 8, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The present invention describes a method and system for combining the beneficial functions of multiple tow trailer types into a single, integrated tow trailer. Specifically, the present invention combines the benefits and advantages of stand alone utility-type trailers and camping trailers into a single, integrated utility/camper trailer.

Figure 1:
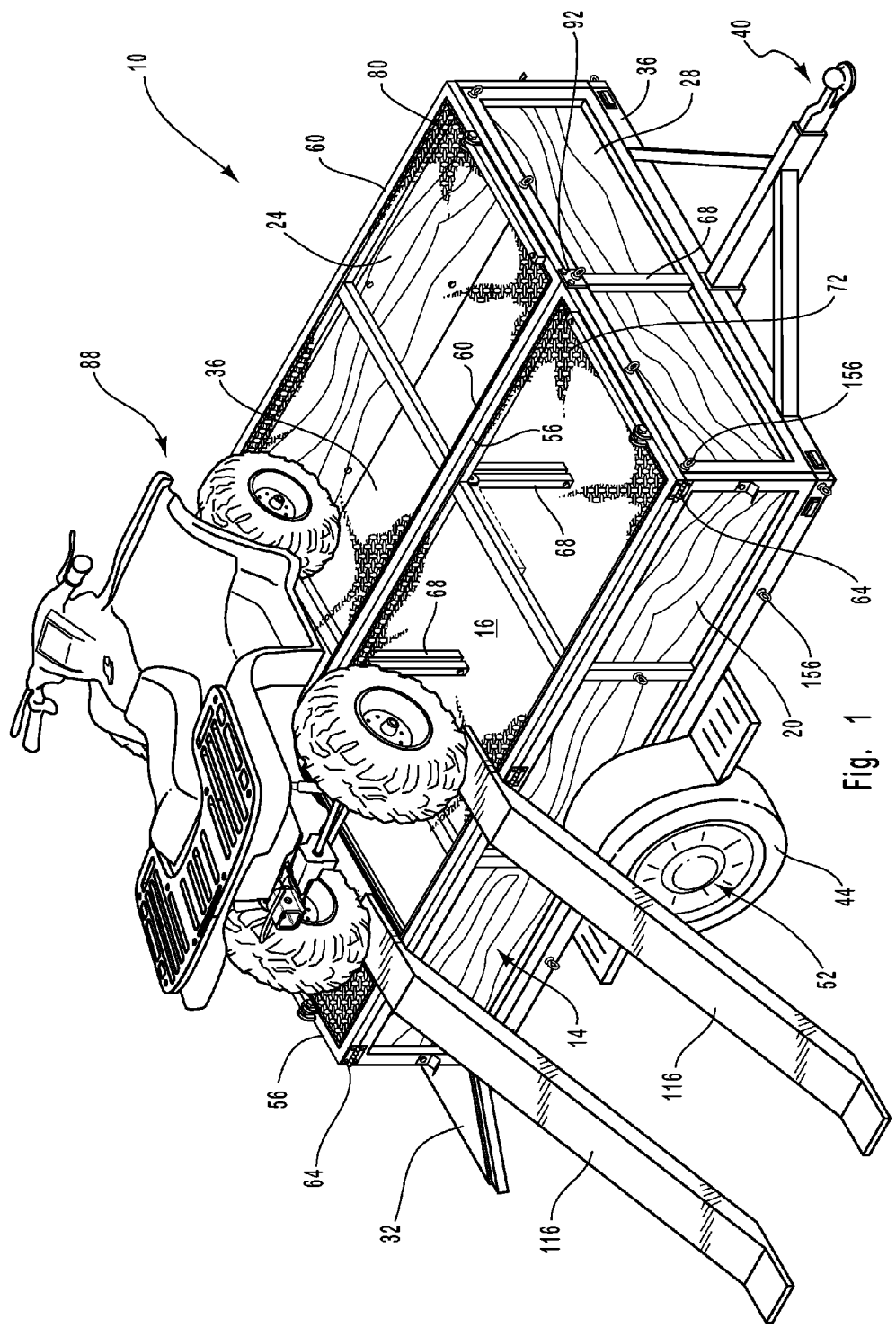
FIG. 1 illustrates a perspective view of the combination utility/camper tow trailer in the first utility functioning configuration.
Figure 2:
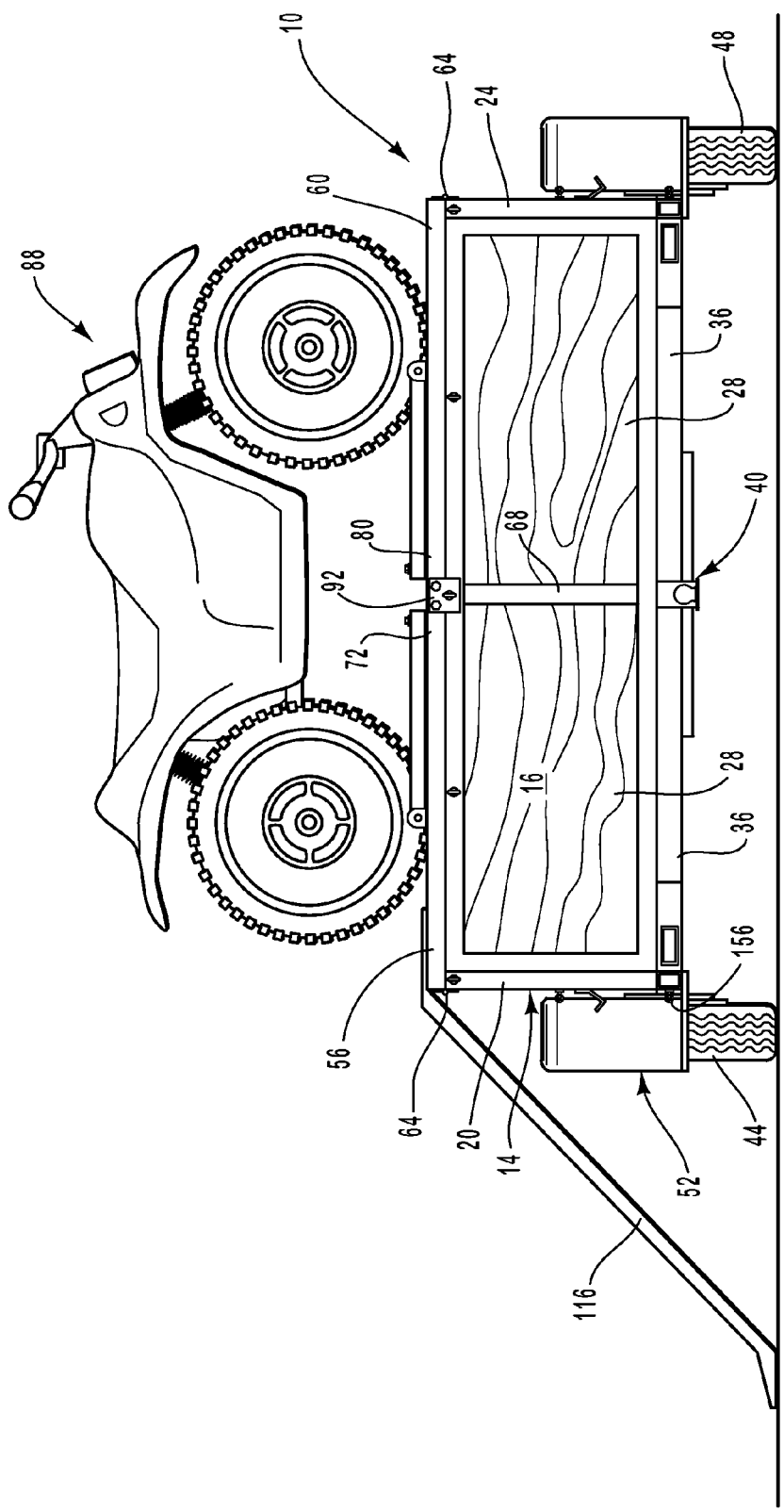
FIG. 2 illustrates a front view of the combination utility/camper tow trailer in the first utility functioning configuration.

Referring to FIGS. 1 and 2, illustrated is the utility/camper trailer 10 in a first utility functioning configuration that includes a hitch assembly 40 coupled to the utility/camper trailer 10 for removably coupling the combination utility/camper trailer 10 to a motorized vehicle (not shown). Utility/camper trailer 10 comprises a first side wall support 20 offset from a second side wall support 24 in an opposing and complimentary relationship to one another so as to comprise the side walls of trailer 10. Trailer 10 further comprises front wall support 28 and an optional rear wall support 32, also offset in an opposing and complimentary relationship from one another, to form and define a perimeter, along with their relationship to floor 36, to comprise trailer bed 14, which is open along its top, and which is capable of accepting a load into its interior 16. First and second side wall supports 20 and 24 and front and rear wall supports 28 and 32 are preferably rigidly coupled to floor 36 so as to provide lateral support for trailer 10, and specifically trailer bed 14, which is capable of accepting and containing a load therein. Moreover, first and second side walls 20 and 24 and front and rear wall supports 28 and 32, respectively, extend upwards from a perimeter portion of floor 36 in a substantially perpendicular manner. The trailer bed 14 is coupled to a wheel assembly 52 and a plurality of tires 44 comprising substantial amounts of tread 48.

As stated, trailer bed 14 comprises an interior portion or storage area 16 defined by the perimeter formed by said first and second side wall supports 20 and 24, and front and rear wall supports 28 and 32. The configuration or setup of trailer 10, and specifically trailer bed 14, preferably comprises the open box-type setup described above. However, one ordinarily skilled in the art may recognize other configurations and setups on which the concepts and designs, as described and discussed herein, may be used.

In the first utility functioning configuration as depicted in FIGS. 1 and 2, utility/camper tow trailer 10 further comprises first configurable panel member 56 and second configurable panel member 60, each attached or coupled to first and second side wall supports 20 and 24, respectively, and positioned so as to provide a first and second utility surface 72 and 80, respectively. Specifically, first and second configurable panel members 56 and 60 extend inward from a top portion of first and second side wall supports 20 and 24 in a substantially perpendicular manner. First and second configurable panel members 56 and 60, when in this first utility functioning position, come to rest upon and are each supported by side wall supports 20 and 24, respectively, as well as front wall support 28 and optional rear wall support 32. The top perimeter portions or surfaces of side wall supports 20 and 24 and the top perimeter portions of front wall and optional rear wall supports 28 and 32 serve to receive first and second configurable panel member 56 and 60 and are of sufficient strength so as to be able to provide the required support for first and second configurable panel members 56 an 60 as these are designed to be load bearing members. Side wall supports 20 and 24, along with front wall support 28 provide the primary and first means of support for first and second configurable panel members 56 and 60.

As additional support may be required, the present invention comprises optional central support member 68, which may be centered within trailer bed 14 and which may be provided to add additional support to first and second configurable panel members 56 and 60 by supporting panel members 56 and 60 along their further most extended edge.

First and second configurable panel members 56 and 60 may be secured in place by securing assembly 92, which may comprise a latch and lock system, a bolt receiving system, a key lock system, or any other possible known type of means capable of securing panel members 56 and 60 in the position shown.

First and second configurable panel members 56 and 60 are preferably constructed of high yield steel, or a combination of various wood/steel elements. While the particular construction is not to be limited, it should be noted that the particular construction and material makeup of panel members 56 and 60 must possess sufficient strength characteristics to allow trailer 10 to be used for its intended purposes.

FIGS. 1 and 2 further show repositioning means 64, which is capable of providing at least partial support to first and second configurable panel members 56 and 60, and which is capable of facilitating the repositioning of panel members 56 and 60 to a different position. It is this repositioning ability of panel members 56 and 60 that allows trailer 10 to comprises multiple functioning configurations in a single, concept integrated trailer, such as a utility functioning configuration or a sleep functioning configuration. As shown, panel members 56 and 60 utilize a hinge system coupling first configurable panel member 56 to first side wall support 20 and second configurable panel member 60 to second side wall support 24. The hinge system allows panel members 56 and 60 to be repositioned between a first utility functioning position, a second utility functioning position, and a sleep functioning position simply by pivoting panel members 56 and 60 about their axis of rotation located at the center of the hinge system. Repositioning means 64 further provides support to panel members 56 and 60 to ensure proper position and alignment during repositioning as well as each intended resting position.

The first utility functioning configuration of FIGS. 1 and 2 provides a sturdy and strong utility surface (72 and 80) that may accept and support various types of loads and cargo. Illustrated is an ATV 88 that is placed upon utility surfaces 72 and 80 with or without using a ramp 116. Ramp 116 may be removable coupled to trailer 10 as is commonly known in the art.

In addition to providing a surface for storing and supporting a load, when panel members 56 and 60 are in this first utility functioning configuration, trailer 10 provides an enclosed storage area 16 where various cargo and other materials may be stored for transport. Further support for a load or materials can be achieved by utilizing fastener 156, which are placed around the trailer bed 14 to increase the security of a load or materials.

Figure 3:
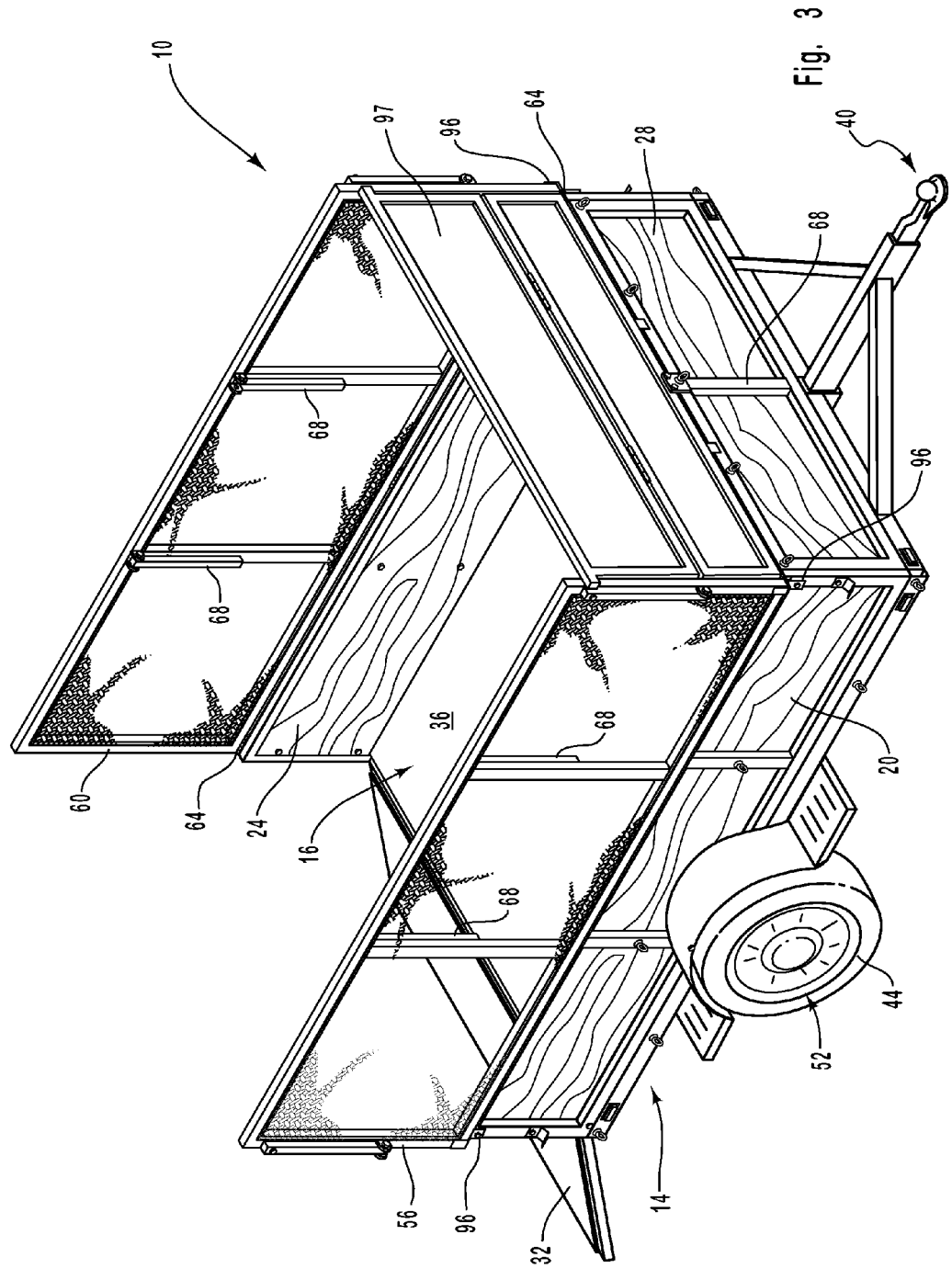
FIG. 3 illustrates a perspective view of the combination utility/camper tow trailer in the second utility functioning configuration.
Figure 4:
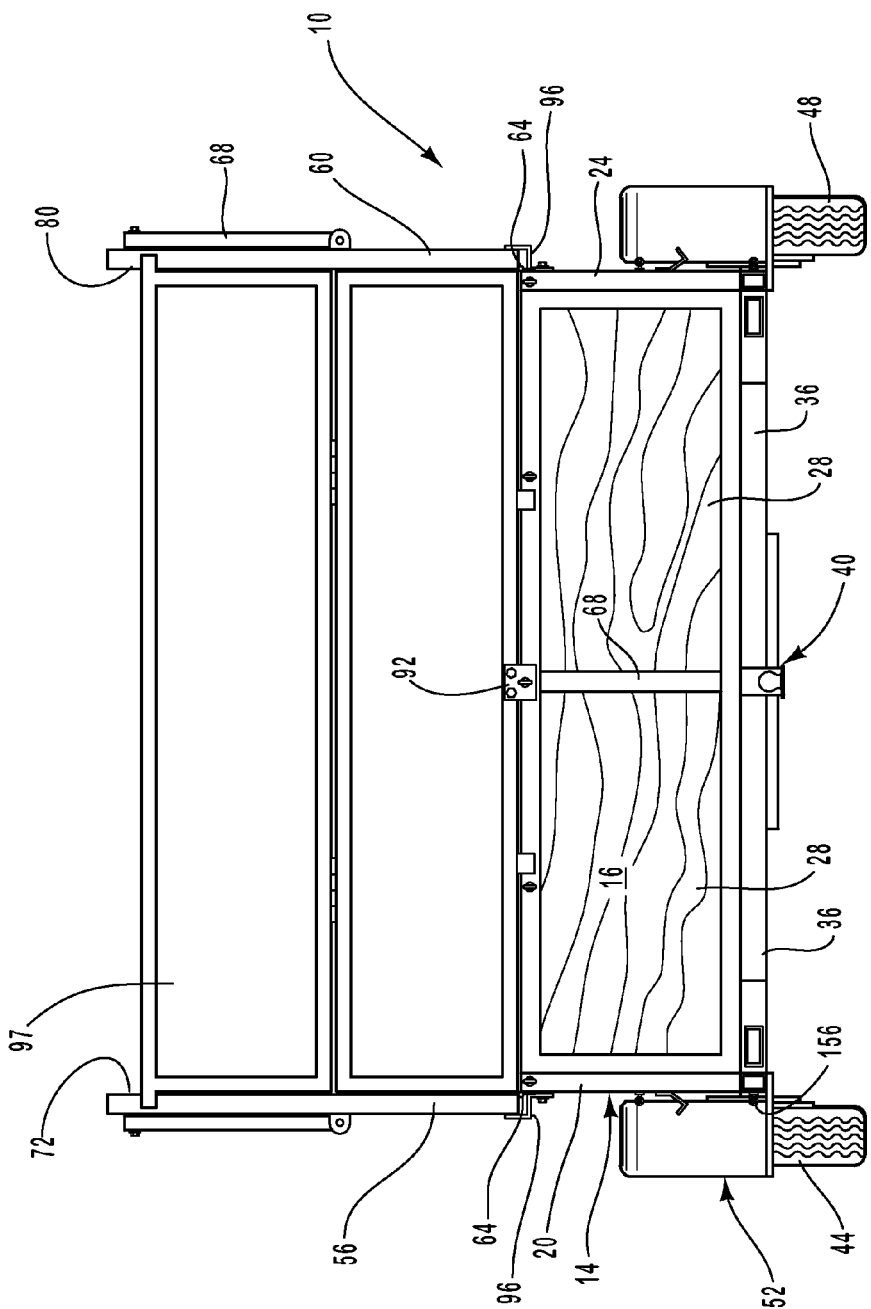
FIG. 4 illustrates a front view of the combination utility/camper tow trailer in the second utility functioning configuration.

Referring now to FIGS. 3 and 4, illustrated is second utility functioning position or configuration. In this configuration, utility/camper tow trailer 10 comprises the same features and elements as that described in the embodiment shown in FIGS. 1 and 2 regarding the trailer 10 and trailer bed 14. Moreover, in the second utility functioning configuration, trailer 10 further comprises first configurable panel member 56 and second configurable panel member 60, each attached or coupled to first and second side wall supports 20 and 24, respectively, and as described above. However, rather than extending substantially perpendicular and inward to form a utility surface, panel members 50 and 60 are each positioned so as to provide a substantially vertical extension to first and second side wall supports 20 and 24. Specifically, first and second configurable panel members 56 and 60 extend from a top portion of first and second side wall supports 20 and 24 in a substantially vertical manner and are supported in place by selectively installing securing mechanism 96. In this configuration, trailer 10 comprises an increased interior storage area 16. Repositioning panel members 56 and 60 to provide an increased interior 16 provides many significant advantages, one of which is to significantly increase in the size and/or amount of cargo that may be placed within interior 16. In this position, panel members 56 and 60 serve to provide additional lateral load support to trailer 10, and particularly trailer bed 14. In addition, securing means 97 is capable of securing panel members in place so as to allow relatively high moments or forces to be applied directly to extended panel members 56 and 60. Therefore, any loads that are carried in interior 16 that exert a force or moment upon panel members 56 and 60 in this second utility functioning configuration will be properly supported.

While prior art trailers may comprise extended side wall supports to increase their respective interior storage areas, the present invention trailer 10 is capable of doing so by repositioning panel members 56 and 60 from another configuration or setup, such as repositioning panel members 56 and 60 from a first utility functioning configuration as described above. Such is advantageous because a user may desire trailer 10 to function as a utility trailer having utility surfaces, or a user may quickly desire a trailer having a larger and more voluminous cargo interior. Using the convertible or repositioning concept as taught and described herein, the user may quickly interchange trailer 10 to accommodate both desires in an almost effortless manner. As will be shown below, trailer 10 may convert back and forth between a first utility functioning configuration, a second utility functioning configuration, and a sleep functioning configuration just by repositioning or configuring first and second configurable panel members 56 and 60 to their respective positions for providing such.

Figure 5:
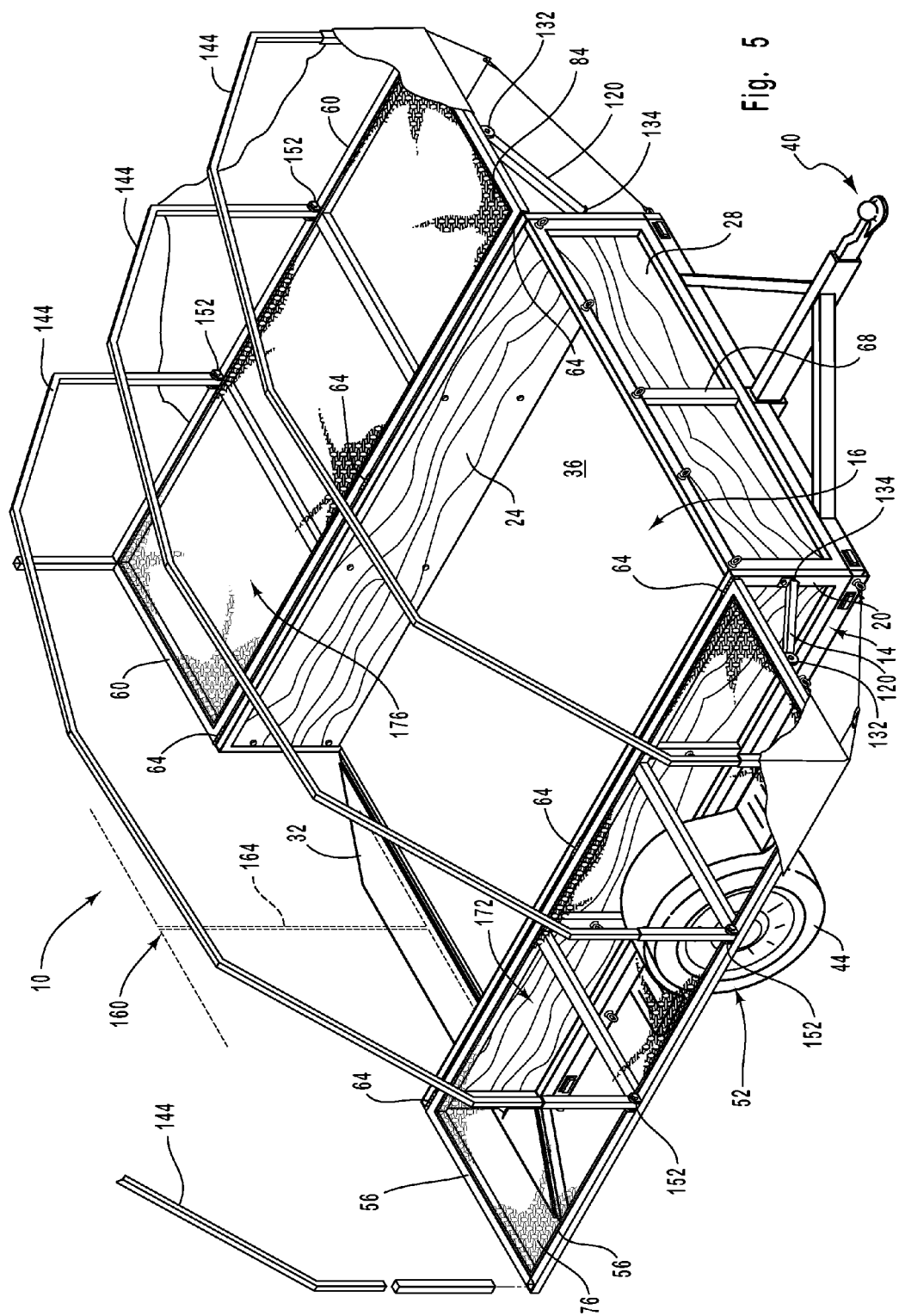
FIG. 5 illustrates a perspective view of the combination utility/camper tow trailer in the sleep functioning configuration.
Figure 6:
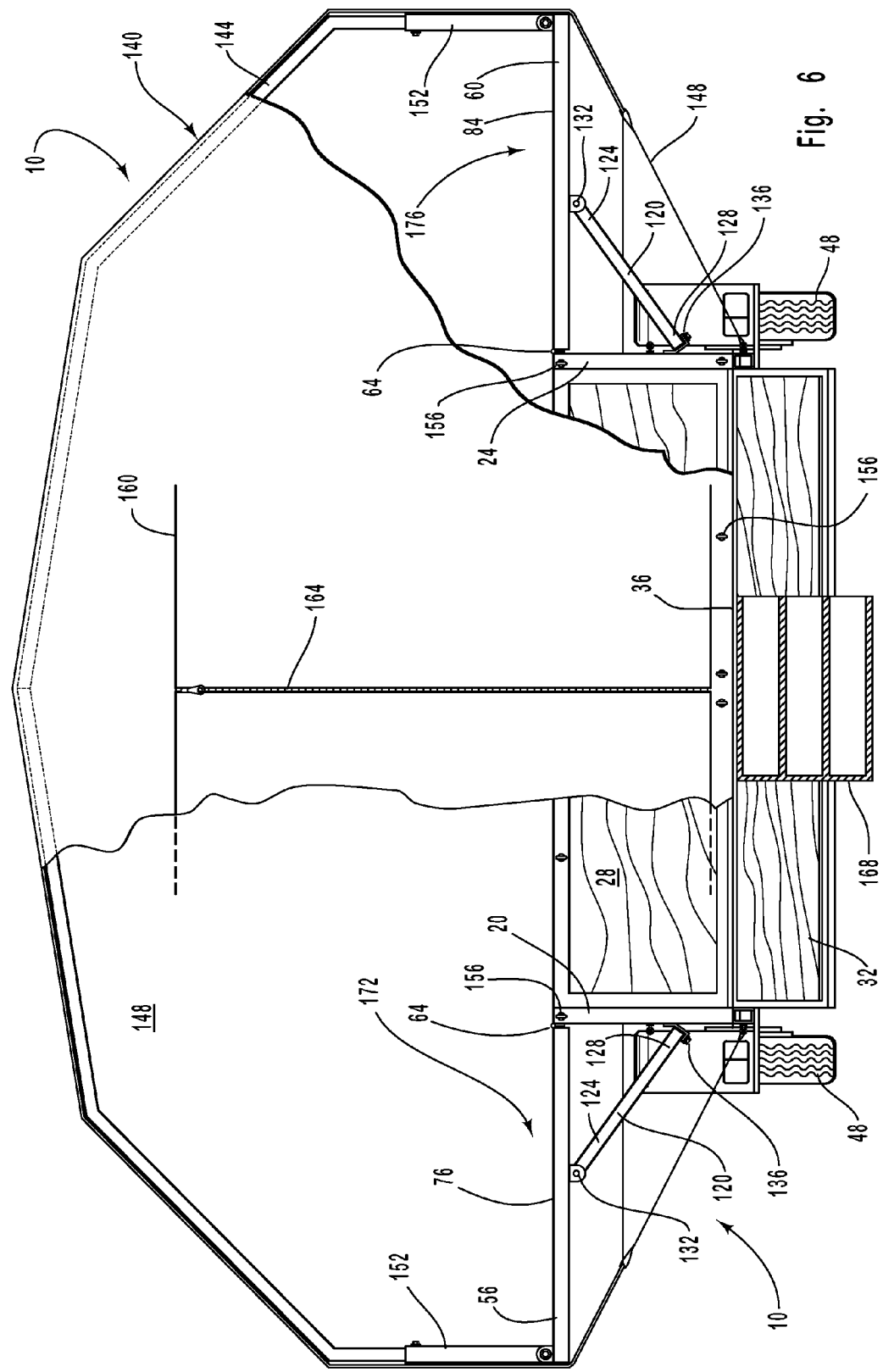
FIG. 6 illustrates a rear view of the combination utility/camper tow trailer in the sleep functioning configuration.

Referring now to FIGS. 5 and 6, illustrated is sleep functioning position or configuration. In this configuration, utility/camper tow trailer 10 comprises the same features and elements as that described in the embodiment shown in FIGS. 1 and 2 regarding the trailer 10 and trailer bed 14. Moreover, in this sleep functioning configuration, trailer 10 further comprises first configurable panel member 56 and second configurable panel member 60, each attached or coupled to first and second side wall supports 20 and 24, respectively, and as described above. However, rather than extending substantially perpendicular and inward to form a utility surface, or rather than extending in a substantially vertical manner to form an increased interior storage area, panel members 50 and 60 are each positioned in a substantially horizontal position, extending outward from a top portion of first and second side wall supports 20 and 24, respectively, such that panel members 56 and 60 are without the perimeter. In this sleep functioning position or configuration, first configurable panel member 56 defines a first sleeping area 172 and second configurable panel member 60 defines a second sleeping area 176.

As shown, configurable panel members 56 and 60 extend in a substantially perpendicular manner from side wall supports 20 and 24. As it is intended that panel members 56 and 60 are load bearing members in this configuration, trailer 10 further comprises brace supports 120 that extend between each of the panel members and trailer 10. As such, panel members 56 and 60 are capable of properly accepting and supporting a load. In this particular embodiment, the load intended to be accepted and supported by panel members 56 and 60 are persons desiring to sleep upon first and second sleeping areas 172 and 176. As such, brace supports 120 are designed to fit between each panel member 56 and 60 and trailer 10, thus functioning like a strut to stabilize and support first and second configurable panel members 56 and 60 in the sleep functioning position. Brace supports 120 comprise a first end 124 that is removably coupled to a configurable panel member attachment 132 located on the underneath or outer exposed surface of panel members 56 and 60. Brace supports 120 further comprise a second end 128 that is removably coupled to a trailer attachment 136 located on the outside of trailer 10, and preferably on the outside of the frame portion of trailer 10 or side wall supports 20 and 24.

First and second sleeping surfaces 76 and 84, respectively, may further comprise some type of padding or other material that softens the surface and makes panel members 56 and 60 more suitable for hosting an individual for extended periods of time.

To convert trailer 10 from one of its utility functioning configurations to the sleep functioning configuration as shown in FIGS. 5 and 6, one simply repositions first and second configurable panel members 56 and 60 by actuating repositioning means 64. In the preferred embodiment, repositioning means comprises a hinge assembly as described above allowing the user to simply pivot panel members 56 and 60 about the hinge axis (as illustrated by the arrows) until panel members 56 and 60 are brought into the desired position as shown.

In the sleep functioning configuration, trailer 10 may be adapted to receive tent assembly 140 as shown in FIGS. 5 and 6. In this configuration, trailer 10 serves to function in a similar manner as a camper or tent trailer. However, rather than requiring two or more trailers, such as one to haul various cargo and other gear or material and another to provide a sleeping area, the present invention utility/camper trailer serves both intended functions. For example, one may pack gear and other materials into interior storage space 16 and then reposition first and second configurable panel members in the first functioning utility configuration as described above, whereon various other loads may be placed, such as an ATV, etc. In addition, one may store tent assembly 140 within interior storage area 16 for later adaptation to trailer 10 when repositioned in the sleep functioning configuration.

As stated, in the sleep functioning configuration of FIGS. 5 and 6, trailer 10 may be adapted to comprise tent assembly 140. Tent assembly 140 is not meant to be limited and may comprise any type of tent capable of being removably coupled to trailer 10 and first and second configurable panel members 56 and 60. In this preferred embodiment, a spring-bar-like tent is disclosed comprising a frame portion or frame assembly 144 that is removably coupled to trailer 10 via removably coupled wall mounts or attachment means 152. Attachment means 152 may be any known device or system that is capable of securely coupling frame assembly 144 to trailer 10.

Tent assembly 140 is designed to fit within interior portion 16 of trailer bed 14 and to spring into place upon repositioning first and second configurable panel members 56 and 60 to the sleep functioning position. Tent assembly 140 comprises frame assembly 144 that preferably comprises a plurality of biased or loaded members that are capable of springing into a "set-up" position, which defines the boundaries of tent assembly 144. Moreover, tent assembly 140 further comprises covering 148 attached to frame assembly 144. Frame assembly 144 and covering 148, while springing into their fully set-up position when trailer 10 is converted to its sleep functioning position, are storable within interior 16 during transport of trailer 10 and when trailer 10 is in its first utility functioning position.

Covering 148 designed to enclose first and second sleeping areas 172 and 176 as well as interior 16 of trailer 10. In this manner, covering 148 provides a totally enclosed sleeping area, wherein a user may enter and receive protection from the outside environment. Covering 148 is preferably designed to be removably coupled to frame assembly 144 and various parts of trailer 10. For instance, covering 148 may attach to trailer 10 using a plurality of fastening means 150, such as snaps, Velcro®, or any other type of fastening means available and known in the art. Covering 148 may further comprise a door assembly 160 having a closeable opening 164, such as a zipper. The user may enter opening 164 and the enclosed sleeping area using steps 168 that may be removably coupled to trailer 10 and stored in interior 16 when not in use. Tent assembly 140 is designed to be easily set up and adapted to fit utility/camper tow trailer 10. When tent assembly 140 is to be removed, it is simply taken down, decoupled from trailer 10 and stored in interior storage space 16 and trailer 10, particularly panel members 56 and 60, are repositioned to a first or second utility functioning configuration (shown as hidden lines in FIG. 6) by relocating panel members 56 and 60 via repositioning means 64.

Figure 7B:
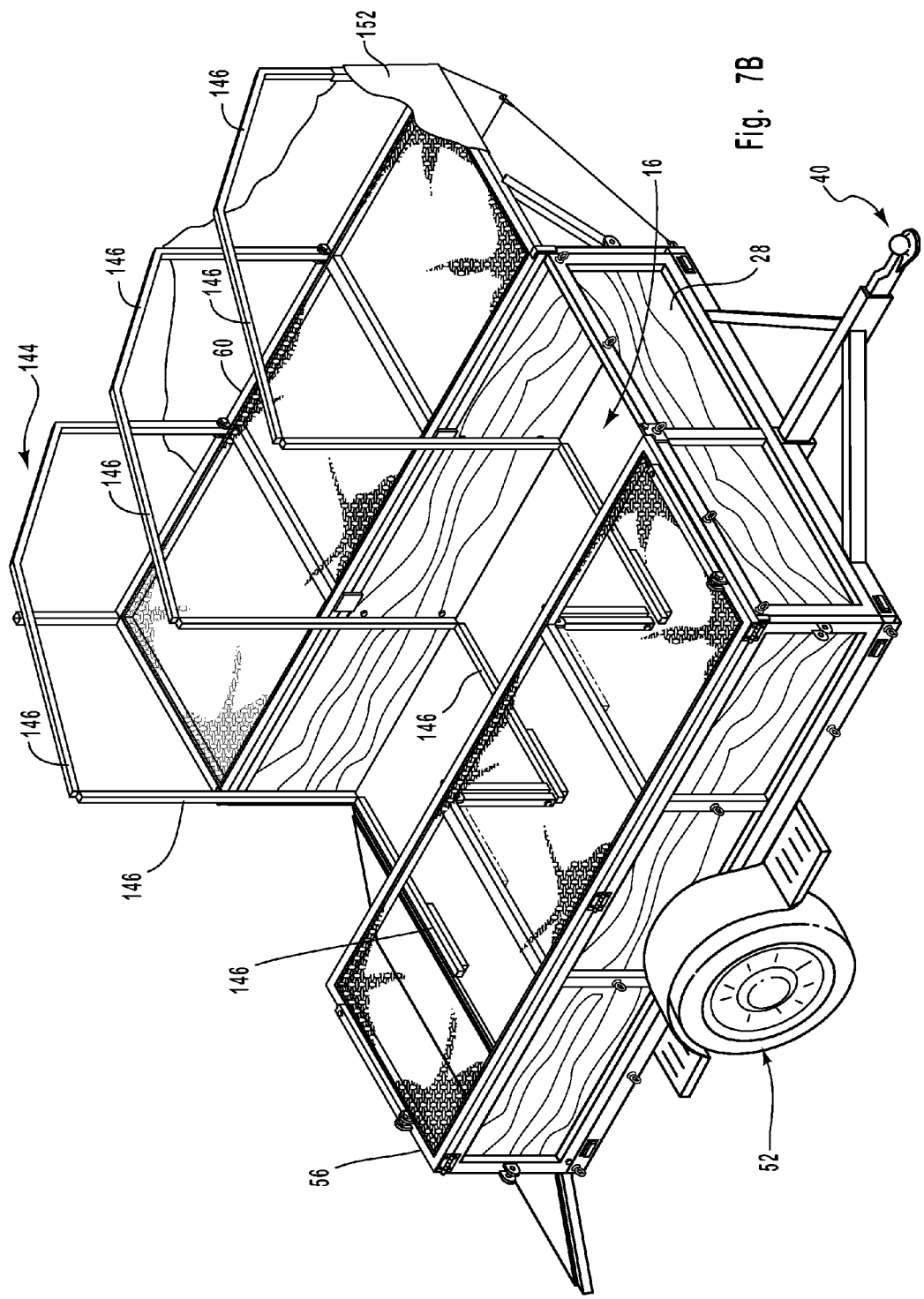
FIG. 7 illustrates an alternative embodiment depicting repositioning means comprising a channel assembly, wherein the first and second configurable panel members are able to slide bi-directionally within the channel to convert the combination utility/camper tow trailer between the first utility functioning configuration and the sleep functioning configuration.
Figure 8:
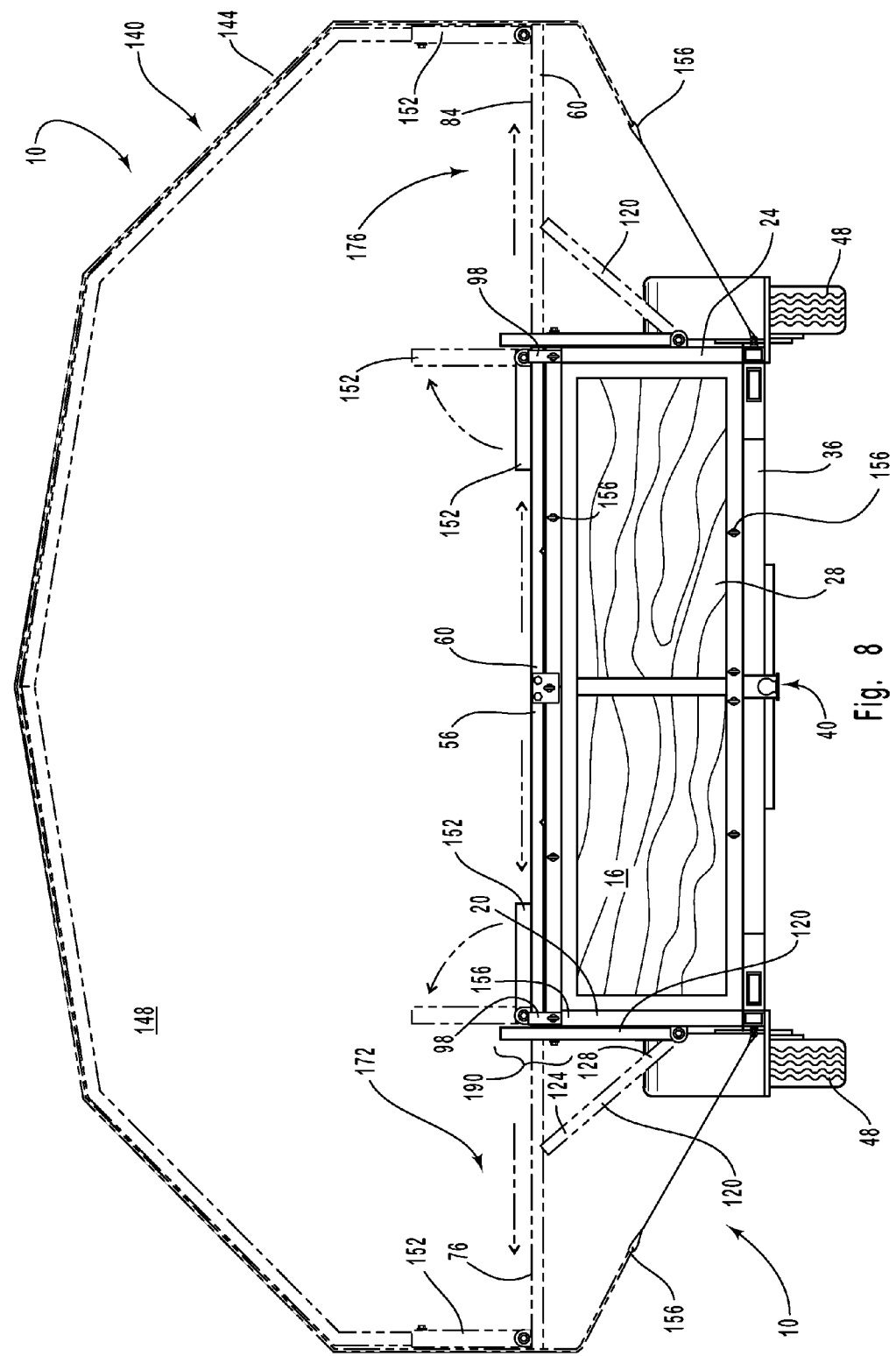
FIG. 8 illustrates a front view of the channel assembly described in FIG. 7.

In an alternate embodiment shown in FIGS. 7 and 8, repositioning means 64 may comprise a channel or groove assembly 190, wherein a channel 98 extends from and along an upper portion of each of first and second side wall supports 20 and 24. Channel 98 is capable of coupling first and second configurable panel members 56 and 60 such that configurable panel members are allowed to slide in a bi-directional manner between the first utility functioning position and the sleep functioning position as described above. Channel assembly 190 further comprises a securing assembly 99 for securing first and second configurable panel members 56 and 60 in their respective positions. Moreover, channel assembly 190 may be adapted to allow first and second configurable panel members 56 and 60 to also be repositioned so that trailer 10 is capable of the second utility functioning configuration as described above.

The present invention further features a method of converting a combination utility/camper tow trailer from a utility trailer to a camper trailer. The method comprises the steps of: coupling to the combination utility/camper tow trailer, having an open trailer bed defined by a first side wall support, a second side wall support, and a front wall support, each extending upwards from a stationary floor, first and second configurable panel members, the first and second configurable panel members coupled to the first and second side wall supports, respectively; positioning the combination utility/camper tow trailer in a first utility functioning configuration, the first utility functioning configuration defined by the first and second configurable panel members being positioned in a substantially horizontal position extending inward from the first and second side wall supports, respectively, the first and second configurable panel members positioned in the first utility functioning position capable of providing a load bearing surface to the combination utility/camper tow trailer; and converting the combination utility/camper tow trailer from the first utility functioning configuration to a sleep functioning configuration via repositioning means, the sleep functioning configuration defined by the first and second configurable panel members being positioned in a substantially horizontal position extending outward from the first and second side wall supports, respectively, the first configurable panel member defining a first sleeping area and the second configurable panel member defining a second sleeping area, the repositioning means capable of facilitating cyclical conversion of the first and second configurable panel members between the first utility functioning configuration and the sleep functioning configuration.

The method further comprises the interim step of converting the combination utility/camper tow trailer from the first utility functioning configuration to a second utility functioning configuration via the repositioning means, wherein the second utility functioning position is defined by the first and second configurable panel members being positioned in a substantially vertical position such that they extend upward from the first and second side wall supports, respectively, the first and second configurable panel members positioned in the second utility functioning position capable of providing an increased interior volume to the trailer bed.

The present invention finally features a method of converting a combination utility/camper tow trailer from a utility trailer to a camper trailer. The method comprises the steps of: coupling to the combination utility/camper tow trailer, having an open trailer bed defined by a first side wall support, a second side wall support, and a front wall support, each extending upwards from a stationary floor, first and second configurable panel members, the first and second configurable panel members coupled to the first and second side wall supports, respectively; positioning the combination utility/camper tow trailer in a first utility functioning configuration, the first utility functioning configuration defined by the first and second configurable panel members being positioned in a substantially horizontal position extending inward from the first and second side wall supports, respectively, the first and second configurable panel members positioned in the first utility functioning position capable of providing a load bearing surface to the combination utility/camper tow trailer; and converting the combination utility/camper tow trailer from the first utility functioning position to a second utility functioning position, wherein the second utility functioning configuration is defined by the first and second configurable panel members being positioned in a substantially vertical position such that they extend upward from the first and second side wall supports, respectively, the first and second configurable panel members positioned in the second utility functioning position capable of providing an increased interior volume to the trailer bed.

This method further comprises the interim step of converting the combination utility/camper tow trailer from the second utility functioning configuration to a sleep functioning configuration via the repositioning means, wherein the sleep functioning configuration is defined by the first and second configurable panel members being positioned in a substantially horizontal position extending outward from the first and second side wall supports, respectively, the first configurable panel member defining a first sleeping area and the second configurable panel member defining a second sleeping area. This sleep functioning configuration is designed to provide a tent assembly and an enclosed sleeping area.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope

The invention claimed is:

1. A combination utility/camper tow trailer comprising:
   a floor;
   a support wall assembly comprising a first side wall support, a second side wall support, and a front wall support, each extending upwards from one or more perimeter portions of said floor, said support wall assembly defining a perimeter, said floor and said support wall assembly defining an open trailer bed having an interior storage area;
   a first configurable panel member attached to said first side wall support and capable of being supported by said front wall support to create a load bearing platform capable of supporting a personal motorized vehicle, substantially suspended above said open trailer bed in a first utility functioning position;
   a second configurable panel member attached to said second side wall support and capable of being supported by said front wall support to create a load bearing platform substantially suspended above said open trailer bed in said first utility functioning position;
   repositioning means for at least partly securing said first and second configurable panel members to said first and second side wall supports, respectively, and for selectively rotating said first and second configurable panel members between said first utility functioning position, a second supported utility functioning position, and a sleep functioning position;
   a wheel assembly coupled to said combination utility/camper tow trailer; and a hitch assembly coupled to said combination utility/camper tow trailer for removably coupling said combination utility/camper tow trailer to a motorized vehicle.

2. The combination utility/camper tow trailer of claim 1, wherein said first and second side wall supports and said front wall support each extend up from respective perimeter side and front sections of said floor, said second side wall support offset from said first side wall support in an opposing and complimentary relationship, said front wall support connected to said first and second side wall supports in a substantially perpendicular manner.

3. The combination utility/camper tow trailer of claim 2, wherein said support wall assembly further comprises a rear wall support extending up from a perpendicular rear section of said floor and connected to said first and second side wall supports in a substantially perpendicular manner, said rear wall support offset from said front wall support in an opposing and complimentary relationship.

4. The combination utility/camper tow trailer of claim 1, wherein said first utility functioning position is defined by said first and second configurable panel members being positioned in a substantially horizontal position extending inward from said first and second side wall supports, respectively, to be within said perimeter, and supported by said first and second side wall supports and said front wall support, said first and second configurable panel members positioned in said first utility functioning position such that they are capable of providing a load bearing surface.

5. The combination utility/camper tow trailer of claim 1, wherein said second utility functioning position is defined by said first and second configurable panel members being positioned in a substantially vertical position such that they extend upward from said first and second side wall supports, respectively, said first and second configurable panel members positioned in said second utility functioning position capable of providing an increased interior volume to said trailer bed.

6. The combination utility/camper tow trailer of claim 1, wherein said sleep functioning position is defined by said first and second configurable panel members being positioned in a substantially horizontal position extending outward from said first and second side wall supports, respectively, and without said perimeter, said first configurable panel member defining a first sleeping area, and said second configurable panel member defining a second sleeping area.

7. The combination utility/camper tow trailer of claim 1, further comprising one or more brace supports to stabilize and support said first and second configurable panel members in said sleep functioning position.

8. The combination utility/camper tow trailer of claim 7, wherein each of said brace supports comprises a first end attached to a trailer attachment located on said trailer bed and a second end attached to a configurable panel member attachment located on each of said first and second configurable panel members.

9. The combination utility/camper tow trailer of claim 1, further comprising a tent assembly capable of being removably coupled to said combination utility/camper tow trailer in said sleep functioning position to provide an enclosed sleeping area, said tent assembly comprising a plurality of biased frame members having a covering attached thereto that spring from a stored position within said interior portion of said trailer into a fully set-up position when said trailer is in said sleep functioning position.

10. The combination utility/camper tow trailer of claim 1, further comprising a center support member for supporting a portion of said first and second configurable panel members in said first utility functioning position.

11. The combination utility/camper tow trailer of claim 1, further comprising securing means for securing said first and second configurable panel members in any of said first and second utility functioning positions and said sleep functioning position.

12. The combination utility/camper tow trailer of claim 1, wherein said repositioning means comprises a hinge assembly coupling said first and second configurable panel members to said first and second side wall supports, respectively, and supporting, at least in part, said first and second configurable panel members in their positioned configurations.

13. The combination utility/camper tow trailer of claim 1, wherein said first and second configurable panel members further comprise padding means thereon for providing a suitable sleeping surface while said trailer is in said sleep functioning configuration.

14. A combination utility/camper tow trailer comprising:
an open trailer bed defined by a first side wall support, a second side wall support, and a front wall support, each extending upwards from a stationary floor;
first and second complimentary configurable panel members coupled to first and second side wall supports, respectively, said first and second configurable panel members allowing said combination utility/camper tow trailer to rotatably convert between:
a first utility functioning configuration defined by said first and second configurable panel members being positioned in a substantially horizontal position extending inward from said first and second side wall supports, respectively, to be within said perimeter, wherein each of said first configurable panel member and second configurable panel member is supported by said front wall support, said first and second configurable panel members positioned in said first utility functioning position capable of providing a load bearing surface capable of supporting a personal motorized vehicle;
a second supported utility functioning configuration defined by said first and second configurable panel members being positioned in a substantially vertical position such that they extend upward from said first and second side wall supports, respectively, said first and second configurable panel members positioned in said second utility functioning position capable of providing an increased interior volume to said trailer bed; and
a sleep functioning configuration defined by said first and second configurable panel members being positioned in a substantially horizontal position extending outward from said first and second side wall supports, respectively, and without said perimeter, said first configurable panel member defining a first sleeping area, and said second configurable panel member defining a second sleeping area;
a central support member coupled to at least one of said first and said second configurable panel members, wherein said central support member reinforces said first utility functioning position; and
repositioning means for facilitating iterative repositioning of said first and second configurable panel members between said first and second utility functioning configurations, and said sleep functioning configuration.

15. A combination camper/utility tow trailer comprising:
a floor;
a support wall assembly comprising a first side wall support, a second side wall support, and a front wall support, each extending upwards from one or more perimeter portions of said floor, said support wall assembly defining a perimeter, said floor and said support wall assembly defining an open trailer bed having an interior storage area;
a first configurable panel member attached to said first side wall support and capable of being supported by said front wall support to create a load bearing platform capable of supporting a personal motorized vehicle, substantially suspended above said open trailer bed in a first utility functioning position;
a second configurable panel member attached to said second side wall support and capable of being supported by said front wall support to create a load bearing platform substantially suspended above said open trailer bed in said first utility functioning position;
repositioning means for at least partly securing said first and second configurable panel members to said first and second side wall supports, respectively, and for selectively rotating said first and second configurable panel members between said first utility functioning position wherein the first and second configurable panel members form an integral surface for receiving a personal motorized vehicle, and a sleep functioning position;
a wheel assembly coupled to said combination utility/camper tow trailer; and
a hitch assembly coupled to said combination utility/camper tow trailer for removably coupling said combination utility/camper tow trailer to a motorized vehicle.

16. The combination camper/utility tow trailer of claim 15 further comprising at least one central support member, the central support member simultaneously being in contact with the floor and the respective panel member.

* * * * *